United States Patent [19]

Hutchinson

[11] 4,404,275

[45] Sep. 13, 1983

[54] INSTANT FILMSTRIP AND METHOD OF MAKING

[75] Inventor: William J. Hutchinson, Rochester, N.Y.

[73] Assignee: Eastman Kodak Company, Rochester, N.Y.

[21] Appl. No.: 396,571

[22] Filed: Jul. 9, 1982

Related U.S. Application Data

[62] Division of Ser. No. 215,889, Dec. 12, 1980, Pat. No. 4,374,195.

[51] Int. Cl.[3] .......... G03B 17/50; G03C 3/00; G03C 9/02

[52] U.S. Cl. .......... 430/501; 430/523; 430/531; 430/536; 430/935; 156/344; 156/249

[58] Field of Search .......... 156/344, 231, 249; 430/501, 523, 531, 536, 935

[56] References Cited

U.S. PATENT DOCUMENTS

| | | | |
|---|---|---|---|
| 2,653,530 | 9/1953 | McCune | 95/88 |
| 3,359,107 | 12/1967 | Goffe et al. | 96/83 |
| 3,364,027 | 1/1968 | Nerwin | 96/78 |
| 3,680,456 | 8/1972 | Nerwin | 95/13 |
| 4,145,133 | 3/1979 | Wareham | 354/275 |
| 4,200,383 | 4/1980 | Bendoni et al. | 354/304 |

OTHER PUBLICATIONS

*Research Disclosure,* Vol. 192, Apr. 1980, No. 19219, Industrial Opportunities Ltd., Homewell, Havant, Hampshire, United Kingdom.

*Primary Examiner*—John E. Kittle
*Assistant Examiner*—John L. Goodrow
*Attorney, Agent, or Firm*—M. S. Sales

[57] ABSTRACT

An elongated filmstrip is provided having two superposed sheets of photographic material helically wound in a cartridge. Typically, one of the sheets is a photosensitive image receiver and the other is a coated processing web. The lateral edges of the filmstrip are sealed to inhibit leakage of processing composition which is spread between the sheets during image development. The sheet which is on the outside of each roll convolution will have a longer path length than the inner sheet, and has sufficient elasticity to accommodate the path length difference. The elastic sheet is provided with a strippable, relatively non-elastic support before being transported through the coating machinery. The sheet, together with its coating and non-elastic support is then adhered to the other sheet of the filmstrip and the support then removed.

4 Claims, 6 Drawing Figures

INSTANT FILMSTRIP AND METHOD OF MAKING

This is a division of application Ser. No. 215,889, filed Dec. 12, 1980, now U.S. Pat. No. 4,374,195.

BACKGROUND OF THE INVENTION

1. Field of the Invention

The present invention relates generally to instant filmstrips, also called self-developing filmstrips. More particularly it relates to instant filmstrips adapted for use in conventional cameras and for providing prompt development of the filmstrip at the photographic site.

2. Description of the Prior Art

Cameras for receiving film packs and individual film units to produce instant photographic prints are commercially available, and cameras for use with self-developing film assemblies to produce instant photographic transparencies are well known in the art. Generally, the latter cameras include special apparatus for effecting rapid processing, such as described in U.S. Pat. No. 3,350,990 entitled "Camera Apparatus" by P. Finelli, issued Nov. 7, 1967. The film assemblies used in these cameras are not suitable for use in conventional cameras.

Still other self-developing type film assemblies are known which are adapted for exposure of the film in conventional, commercially available cameras. For example, U.S. Pat. No. 4,145,133 entitled "Film Assemblage of the Self-Developing Type Together With Apparatus for Processing Thereof" by R. R. Wareham, issued Mar. 20, 1979, and U.S. Pat. No. 4,200,383 entitled "Transparency Film Processor" by L. V. Bendoni et al, issued Apr. 29, 1980, disclose film assemblies adapted for exposure in conventional 35 mm cameras and for development in special processors which are portable enough to carry to the photographic site.

The film assembly disclosed in the Wareham patent includes an elongated filmstrip having two superposed sheets coated with photographic material helically wound in a cartridge with a pod of processing composition. A strip of heat-activated adhesive is disposed along each lateral edge of the filmstrip between the superposed sheets. After exposure, the entire filmstrip, including the pod, is withdrawn from the cartridge and loaded into a special processor. In the processor, the adhesive is heated to seal the edges of the sheets together, and the filmstrip is run between pressure rollers to break the pod and spread the processing composition between the sealed sheets.

The step of heat-sealing the lateral edges of the Wareham assembly effectively rules out the possibility of in-camera processing in conventional cameras not provided with heat-sealing apparatus. The film assembly disclosed in the Bendoni et al patent does not employ heat-activated adhesive to seal the filmstrip edges. Instead, a pair of spaced apart rails between the two superposed photographic material sheets cooperate with ribs in a special processor for inhibiting leakage of processing composition.

SUMMARY OF THE INVENTION

In accordance with the present invention, a film assembly has two elongated, superposed sheets coated with photographic material helically wound in a roll. One of the sheets can be a photosensitive image receiver and the other a processing web, also referred to as a cover sheet. In another embodiment, one of the sheets could also be a photosensitive element and the other an image-receiving element. The lateral edges of the elongated sheets are sealed together to inhibit leakage of processing composition which is spread between the sheets during image development.

Because the film is wound into a roll, the superposed sheets will experience different path lengths. Specifically the sheet which is on the outside of each convolution will have a longer path length than the inner sheet. To accommodate the path length difference, the outer sheet is formed of an elastic material. In order to coat the web of elastic material, which is difficult to transport through coating machinery, the web is provided with a strippable, relatively non-elastic support before being transported through the coating machinery. The sheet, together with its coating and non-elastic support is then adhered to the other sheet of the filmstrip, and the non-elastic support then removed.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

The present invention is particularly useful in self-developing films for use in conventional cameras such as 35 mm cameras. However, it is equally applicable for use with other film sizes and formats.

Figure 1:
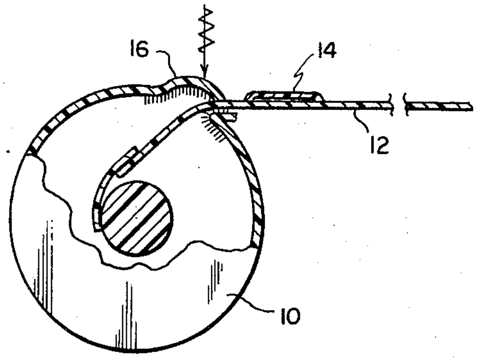
FIG. 1 is a partially sectioned side view of a filmstrip formed in accordance with the present invention and of a film magazine adapted to receive the filmstrip.
Figure 2:
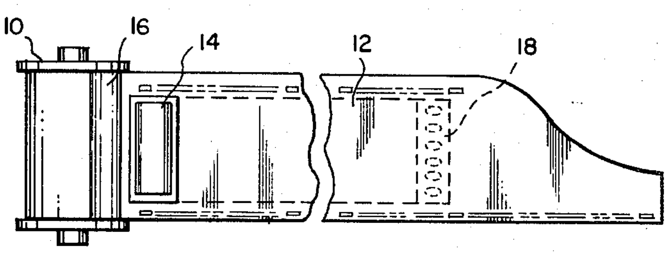
FIG. 2 is a top plan view of the filmstrip and magazine shown in FIG. 1.

FIGS. 1 and 2 show a light-tight magazine 10 and a filmstrip 12 which is adapted to be wound into the magazine. Filmstrip 12 comprises at least two superposed sheets coated with photographic material and preferably, at least one pod 14 of processing composition disposed adjacent to the trailing end of the filmstrip, and a pair of spacer rails 24 and 26.

The filmstrip is initially wound in magazine 10 from which it is withdrawn during advancement through the exposure station of a camera. Once the entire length of filmstrip 12, including pod 14 is withdrawn from magazine 10, the operator activates the camera's rewind mechanism to advance the exposed film, trailing end first, back to the cartridge. A lip 16 of the cartridge is designed to permit removal of pod 14 but breaks the pod during rewind and then acts as a doctor blade to meter and spread the processing composition between the superposed sheets of filmstrip 12 as the filmstrip is wound tightly inside the magazine. A trap 18 may be provided at the leading end of the filmstrip to receive any excess processing composition. After development is complete, the filmstrip is pulled out of the magazine and the cover sheet and rails stripped and discarded. Further details and alternative embodiments of the magazine may be found in Volume 192, pages 132–134 of *Research Disclosure,* published in April 1980 by Industrial Opportunities Ltd. of the United Kingdom. The filmstrip of this invention can be used to provide either transparencies or reflection prints in color or in black-and-white, as desired.

Figure 3:
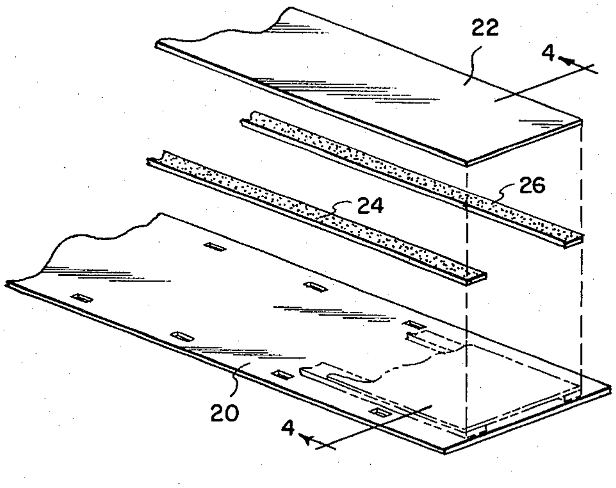
FIG. 3 is a view of a portion of the filmstrip of FIGS. 1 and 2 shown in exploded perspective.
Figure 4:
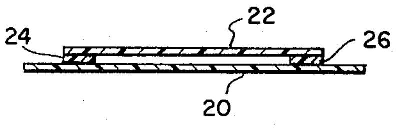
FIG. 4 is a sectional view of the assembled filmstrip taken along line 4—4 of FIG. 3.

Filmstrip 12 includes first and second sheets 20 and 22, respectively, of photographic material as shown in FIGS. 3 and 4. In the illustrated embodiment, sheet 20 is an integral imaging receiver and sheet 22 is a cover sheet.

Integral imaging receiver sheet 20 can comprise various photographic layers well known to those skilled in the art, such as those described in Example 5 of U.S. Pat. No. 4,209,580 of McCreary et al, issued June 24, 1980.

Cover sheet 22 is formed of a relatively elastic support, such as polyethylene, coated with process control layers to control the duration of development, such as those described in Example 5 of U.S. Pat. No. 4,209,580. A suitable processing composition is also disclosed in Example 5 of that patent.

In another embodiment of the invention, sheet 20 can comprise a photosensitive element comprising photographic layers such as those described in columns 19 and 20 of U.S. Pat. No. 4,231,950 of Idelson issued Nov. 4, 1980. In this embodiment, sheet 22 could comprise an image-receiving element also as described in columns 20 and 21 of that patent.

A pair of longitudinally extending rails 24 and 26 are secured to the lateral edges of cover sheet 22 so as to provide a predetermined spacing between sheets 20 and 22 during spreading of processing composition from pod 14. The rails are also secured to sheet 20, as explained below, to prevent leaking of the processing composition from the lateral edges of the filmstrip. The bonding strength of rails 24 and 26 to sheet 20 is sufficient to prevent such leakage yet not so strong as to impede stripping cover sheet 22 and the rails from image receiver sheet 20 after processing.

As mentioned before, a feature of the present invention is the provision for elongation of cover sheet 22 to accommodate for the path length difference between cover sheet 22 and image receiver sheet 20. The incremental differential distance is defined, with reference to FIG. 5, as $(r_2-r_1)O$, where $r_1$ is the radius of curvature of image receiver sheet 20, $r_2$ is the radius of curvature of cover sheet 22, and O is the angle of wrap. The elasticity of cover sheet 22 allows it to stretch as the filmstrip is wound into a roll. Without such elasticity, either rails 24 and 26 could not be bonded to both sheets 20 and 22 (as discussed in connection with U.S. Pat. No. 4,200,383) or, if, the rails were bonded to both sheets, image receiver sheet 22 would be subject to buckling and to separation from the rails. Buckling and separation of the sheets from the rails are objectionable because they lead to non-uniform layers of processing composition, as well as to leakage of such composition. By using an elastic outer sheet, a weaker adhesive may be used between the rails and the image receiver, facilitating stripping the sheets after processing.

However, as described above, cover sheet 22 includes an elastic polyethylene support to which has been applied layers of photographic materials. These layers are normally applied by extrusion onto the moving support web. But unsupported polyethylene which is thin enough to provide the desired elasticity has too much elasticity to accommodate the tension forces in extrusion coating machines.

Figures 5, 6:
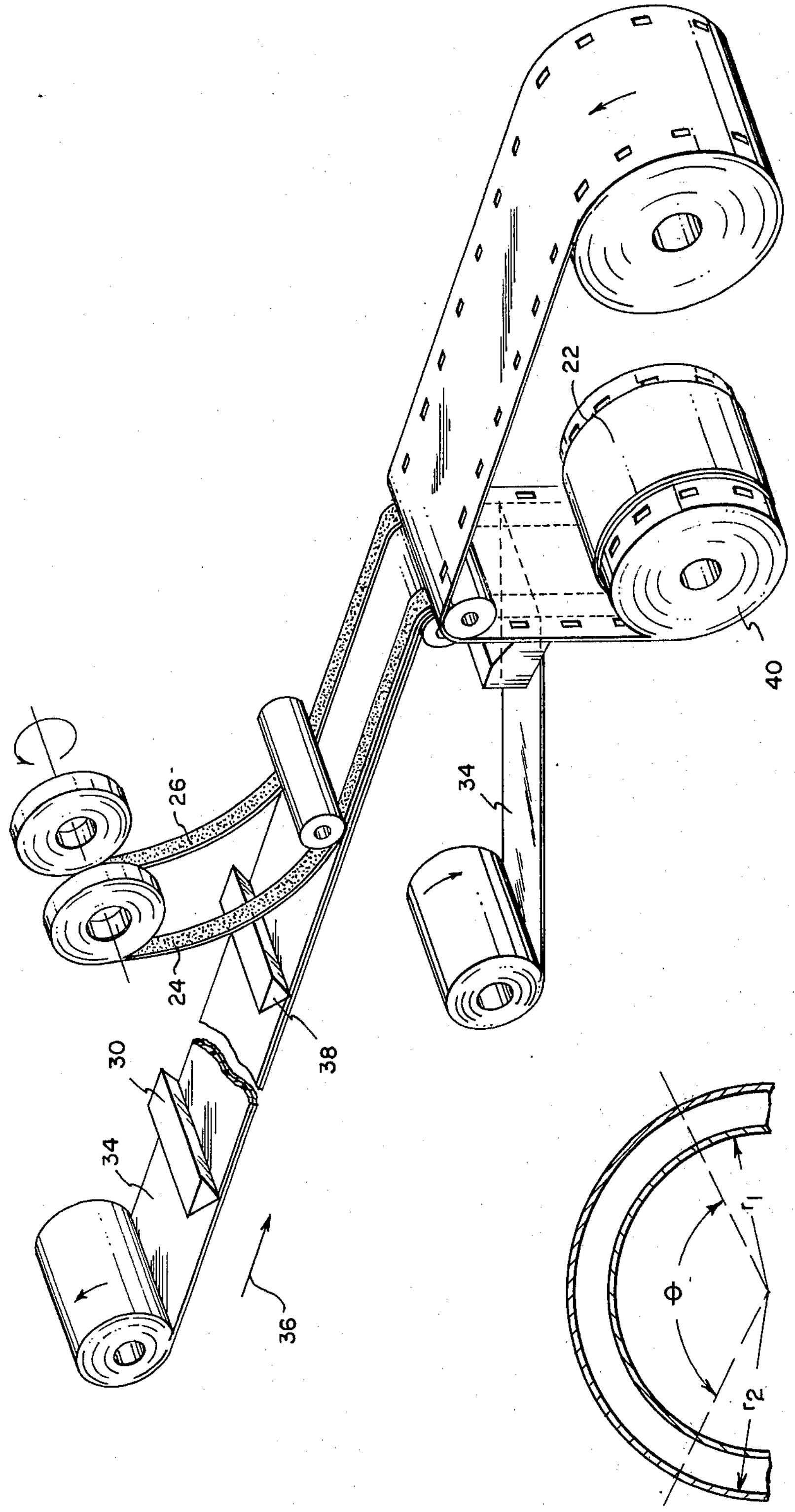
FIG. 5 is a schematic side view of a portion of one convolution of the filmstrip.
FIG. 6 is a schematic view of the assembly operation for the filmstrip shown in FIG. 1.

FIG. 6 schematically shows a method according to the present invention for providing sufficient dimensional stability to the polyethylene support during the coating process by coating the polyethylene onto a web of dimensionally stable paper. In that figure, an extruder 30 lays a coating of polyethylene 32 onto a web 34 of paper support which moves under the extruder in the direction of arrow 36.

Often polyethylene is coated onto corona discharge treated paper at an approximate temperature of 330° C. to insure good adhesion of the polyethylene and paper. However, I have found that for the present use, a hopper temperature of about 300° C. without corona treatment provides adequate adhesion for subsequent coating while producing a sufficiently weak bond to promote removal of the paper from the polyethylene after assembly to the image receiver sheet.

After the polyethylene-coated paper support has set, it is transported under one or more extruders 38 where photographic materials are coated onto the polyethylene layer. Rails 24 and 26 are applied to the cover sheet, and the assemblage is attached to image receiver sheet 20. Paper web 34 is removed from the cover sheet, and the filmstrip is wound in a roll 40.

Although the invention has been described with particular reference to a preferred embodiment thereof, it will be readily understood that variations and modifications can be effected with the spirit and scope of the invention as described hereinabove and as defined in the appended claims.

I claim:

1. A method for making a coated sheet of elastic material for photographic film for subsequent application to a relatively non-elastic support, said method comprising the steps of:

applying a layer of relatively elastic material to a relatively inelastic sheet to provide dimensional stability to the elastic layer;

coating at least one layer of photographic material onto said elastic layer; and stripping said relatively inelastic sheet from said relatively elastic material.

2. A method for making an elongated, filmstrip having two superposed sheets coated with photographic material joined at their lateral edges and wound in a roll, said method comprising the steps of:

forming one of said sheets by applying a relatively elastic material to a relatively inelastic support;

coating said elastic material with photographic materials;

sealing the lateral edges of said elastic material to the other of said sheets; and stripping said inelastic support from said elastic material.

3. A method for making an elongated, helically wound filmstrip having two superposed sheets coated with photographic material joined at their lateral edges and wound in a roll, said method comprising the steps of:

forming one of said sheets by coating a relatively inelastic support with a layer of polyethylene;

coating said polyethylene layer with photographic materials;

sealing the lateral edges of said polyethylene layer to the other of said sheets; and stripping said inelastic support from said polyethylene layer.

4. The method defined in claim 3 wherein said polyethylene layer is applied at an approximate temperature of 300° C.

* * * * *